United States Patent

Downs

[11] 4,133,287
[45] Jan. 9, 1979

[54] RESERVOIR WITH INTEGRALLY FORMED WINDOW AND METHOD OF MAKING SAME

[75] Inventor: Thomas C. Downs, Tipp City, Ohio

[73] Assignee: General Motors Corporation, Detroit, Mich.

[21] Appl. No.: 877,017

[22] Filed: Feb. 13, 1978

[51] Int. Cl.² ............... G01D 11/26; G01F 23/02
[52] U.S. Cl. ................... 116/227; 60/534; 60/592; 73/334; 220/82 R; 264/136; 116/276
[58] Field of Search ............ 116/118 R; 73/293, 334, 73/323; 220/82 R; 188/1 A; 264/136; 428/35, 38; 60/534, 535, 592

[56] References Cited

U.S. PATENT DOCUMENTS

| | | | |
|---|---|---|---|
| 2,311,613 | 2/1943 | Slayter | 264/136 X |
| 2,313,889 | 3/1943 | Porter | 73/323 X |
| 2,755,629 | 7/1956 | Baisch | 73/323 X |
| 3,096,648 | 7/1963 | Dombeck et al. | 73/334 |
| 3,096,748 | 7/1963 | Harry | 73/323 |
| 3,103,816 | 9/1963 | Kawecki | 73/334 X |
| 3,339,519 | 9/1967 | Taylor et al. | 116/118 R |
| 3,432,380 | 3/1969 | Weber | 220/82 R |

Primary Examiner—Daniel M. Yasich
Attorney, Agent, or Firm—D. D. McGraw

[57] ABSTRACT

A master cylinder reservoir molded of glass fiber filled nylon. An integrally molded window in a side wall is thinner than the reservoir walls and has a lower concentration of fibers so that it is sufficiently translucent to permit visual determination of the level of hydraulic brake fluid in the reservoir by observation through the window. The method of making the reservoir by molding, in which the flow of fibers into the window section is restricted to reduce the fiber concentration in the window and make it more translucent, is also disclosed.

5 Claims, 3 Drawing Figures

RESERVOIR WITH INTEGRALLY FORMED WINDOW AND METHOD OF MAKING SAME

The invention relates to a liquid reservoir with a window integrally formed in a side wall so that the level of liquid in the reservoir can be visually determined by observing the liquid level through the window. The invention also relates to the method of making the reservoir with the integrally formed window.

It has been considered desirable for some years to provide some means of indicating the level of fluid in reservoirs, and particularly in brake master cylinders for automotive vehicles. Numerous types of indicators have been proposed and utilized. Some indicators utilized a magnetically operated switch which is closed when the fluid level reaches a low limit requiring warning to the vehicle operator. Thermistor probes have also been utilized in a similar manner. Glass sight gages have been installed in a side wall of the master cylinder so that the liquid level may be visually determined through the sight gage. Typically such sight gages are threaded into an opening formed in the cylinder wall and sealed against leakage. Plastic reservoirs made of polypropylene or polyethylene have been utilized primarily on automotive vehicles made for the European market. Such reservoirs are transparent or translucent throughout the reservoir body and the level of liquid therein can be observed. Reservoirs have also been provided with sight gages extending from the main reservoir housing and connected so that the fluid level in the reservoir is also found in the sight gage. Such sight gages are typically glass or plastic tubing connected by a short length of piping or tubing to the reservoir. It is well known to mount glass or other transparent material in the side wall of a reservoir, often providing graduation markings on the glass to indicate the liquid level.

It has been found that polypropylene and polyethylene reservoirs are usable in vehicles where the engine compartment temperatures remain sufficiently low so as not to cause adverse effects on the plastic. However, engine compartment temperatures on some automobiles, and particularly on those with larger engines and several engine driven accessories, tend to exceed the limit for use of such materials in the engine compartment. It has therefore been found to be desirable, when using a plastic type reservoir, to utilize a plastic such as nylon which has a much higher usable range of temperature. It has also been found to be advisable to utilize a reinforcing or strengthening agent in the nylon. Such an agent may be a fiber filling. Glass fibers have been found to be very acceptable for this purpose. The problem with regard to fluid liquid indication in the use of such materials is that the reservoir no longer is sufficiently translucent to be able to observe the level of the fluid in the reservoir through any portion of the reservoir side wall. This then requires a fluid level indicator to be provided which operates satisfactorily even though the reservoir housing is not translucent. Several of the types of indicators noted above can still be used, but have been found to be more expensive and also less reliable than a visual indication through the reservoir side wall. The use of sight gages or window inserts create the potential for leakage and damage which is not found if the reservoir is provided with an integral translucent area.

It is therefore an object of this invention to provide a one-piece reservoir housing having an integrally formed window in a housing side wall which is sufficiently translucent, even though the major portion of the reservoir housing is not sufficiently translucent, to visually determine the level of liquid in the reservoir by observation of the liquid level through the window. The invention also involves the method of making such a reservoir.

IN THE DRAWING

Figure 1:
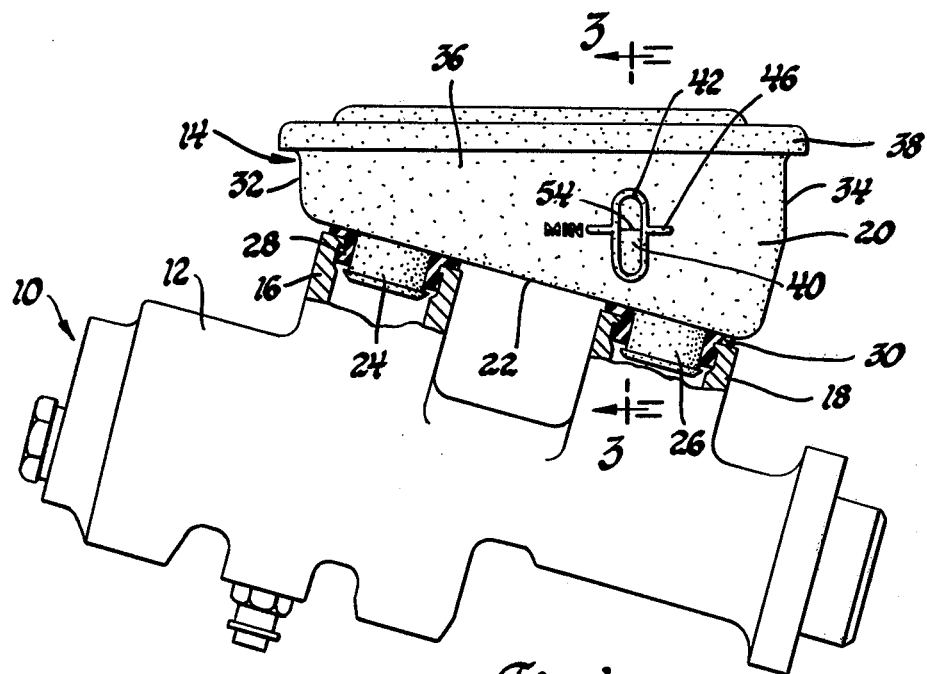
FIG. 1 is an elevation view of a master cylinder assembly, with parts broken away and in section, and showing a reservoir embodying the invention.

The master cylinder assembly 10 includes a cylinder housing 12 and a brake fluid reservoir 14. The cylinder housing has bosses 16 and 18 formed thereon which provide for the mounting of the reservoir on the cylinder housing and also provide for transmission of brake fluid between the reservoir and the master cylinder housing. The reservoir housing 20 has a bottom wall 22 from which integrally molded spigots 24 and 26 extend downwardly. These spigots are received through grommets 28 and 30 and snap into place in the upper ends of the passages formed through bosses 16 and 18. The reservoir housing 20 also has side walls. The forward side wall 32, the rear side wall 34, and one of the lateral side walls 36 are shown in FIG. 1. A cover 38 is suitably secured to the reservoir housing 20.

The housing side wall 36 has a window 40 integrally formed therein and extending vertically a sufficient distance to cover the usual range of the level of the hydraulic fluid contained within the reservoir. The window 40 is an integrally formed part of the housing 20 and is made during the molding process at the same time as the remainder of the housing.

A reinforcement member or bead 42 extends laterally outward from the outer surface 44 of the side wall 36 and surrounds the window 40. A gage mark 46, illustrated as being formed as a part of the reinforcement member 42 and extending to either side thereof at about the middle portion of window 40, is also provided on the outer surface 44 of the housing side wall 36. A suitable legend may be provided to indicate the meaning of the gage mark 46. In the illustration in the drawing, the gage mark 46 indicates the minimum fluid level desired within the reservoir 14.

Figure 2:
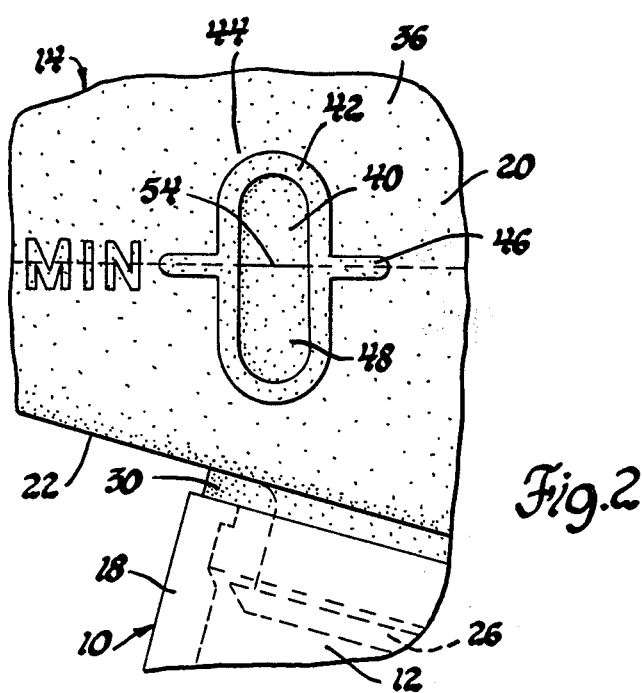
FIG. 2 is a fragmentary elevation view showing a portion of the reservoir housing of the assembly of FIG. 1 in greater detail.
Figure 3:
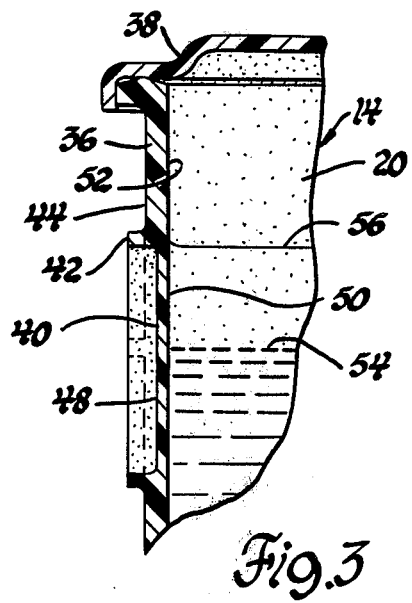
FIG. 3 is a fragmentary cross section view, with parts broken away, taken in the direction of arrows 3—3 of FIG. 1.

The outer surface 48 of the window 40 is recessed within the reinforcement member 42 so that the reinforcement member will also function to protect the window from exterior contact by tools or debris, for example. The window inner surface 50 is continuous with the inner surface 52 of the side wall 36. As seen in FIGS. 2 and 3, the fluid level 54, indicated by the free surface of the hydraulic fluid in the reservoir, may be located so that it is along a portion of the window inner surface 50. Since the master cylinder assembly 10 is of the dual master cylinder type, the reservoir 14 is illustrated as also having a divider 56 separating the reservoir into front and rear chamber sections. The divider 56 is seen in FIG. 3.

The reservoir 14 is made of a plastic with discrete particle filling. The plastic is preferably nylon and the discrete particles providing the filling are fibers which are preferably glass fibers. The fibers act as a strengthening or reinforcing agent. One of the problems in establishing a direct observation fluid level indicating device of this type occurs when some plastics are utilized which are not as translucent as might be desired. The use of the discrete particles also add to the problem by decreasing translucence. This is true of glass fiber as used in a mixture with nylon to form the reservoir housing 20. It is therefore desirable to provide a lower concentration of fibers in the material forming the window 40 as compared to the concentration found in the mixture introduced into the mold as the housing is made. The concentration of fiber in the housing side and bottom walls is preferably substantially the same as the concentration found in the mixture introduced into the mold for making this housing. Translucence of the window 40 is also obtained by making the window of a much thinner section as compared to the thickness of the housing walls. This is clearly illustrated in FIG. 3. When the mold for making the housing is provided, one of the mold elements forming and defining the outer surface 44 of side wall 36 as well as the outer surface 48 of the window 40 is positioned relative to the mold element defining the window inner surface 50 and the side wall inner surface 52 to provide a cavity area for molding a thin window cross section, and cavity areas for molding thick wall cross sections. The mixture of nylon and fiber filling introduced into the mold is such that the fiber filling will flow with the nylon into the wider cavity areas without any substantial restrictions so as to define the various walls as well as the spigots 24 and 26. However, the restriction between the mold sections in the area of window 40 is such that the fibers do not flow as readily into the cavity area which defines the window 40. Therefore the concentration of fibers in the material forming the window 40 during the molding process is substantially less than the concentration of fibers found in other parts of the housing, and the window is predominantly nylon. Relatively thin window sections and the absence of much of the fiber filling in the window section contribute to the light transmittal capability of the window and renders it sufficiently translucent to permit the level of liquid contained within the reservoir housing to be visually determined by observation through the window. Thus the window 40 is molded concurrently as the reservoir housing is molded, is made of the same material, and has desirable light transmittal characteristics which are not found in the thicker housing walls, and particularly in the walls because of the concentration of fiber filling therein.

What is claimed is:

1. A liquid reservoir having an integrally formed window for visually determining the level of liquid adapted to be contained therein, said reservoir comprising:
    a one-piece reservoir housing molded from a mixture of plastic and discrete particles, said housing having side and bottom walls of sufficient thickness and density to contain liquid in an automobile engine compartment environment and characterized by having such a low level of light transmittal as a result of such thickness and density of discrete particles that the level of liquid contained therein may not be normally determined visually by observation through a side wall;
    at least one side wall having a window integrally molded therein from the mixture of plastic and discrete particles during the molding of said reservoir housing;
    said window being sufficiently thin and so molded that the concentration of discrete particles in the window is substantially less than the concentration of discrete particles in the other parts of the housing, providing a sufficiently high level of light transmittal through said window to permit the level of liquid contained in said reservoir housing to be visually determined by observation through said window.

2. A liquid reservoir having an integrally formed window for visually determining the level of liquid adapted to be contained therein, said reservoir comprising:
    a one-piece reservoir housing molded from a mixture of plastic and discrete particles acting as a mechanical strengthening agent, said housing having side and bottom walls of sufficient thickness and density to contain liquid in an automobile engine compartment environment and characterized by having such a low level of light transmittal as a result of such thickness and density of the discrete particles that the level of liquid contained therein may not be normally determined visually by observation through a side wall;
    at least one side wall having a window integrally molded therein from the mixture of plastic and discrete particles during the molding of said reservoir housing;
    and a reinforcement bead integrally formed on and extending outwardly from the outer surface of said at least one side wall about said window so that the window outer surface is protectively recessed within said reinforcement bead;
    said window being sufficiently thin and so molded that the concentration of discrete particles in the window is substantially less than the concentration of discrete particles in the other parts of the housing, providing a sufficiently high level of light transmittal through said window to permit the level of liquid contained in said reservoir housing to be visually determined by observation through said window.

3. A master cylinder reservoir having an integrally formed window for visually determining the level of hydraulic fluid adapted to be contained therein, said reservoir comprising:
    a one-piece reservoir housing molded of fiber-filled nylon and having side and bottom walls of sufficient thickness and density to contain hydraulic fluid in an automobile engine compartment environment and characterized by such a low level of translucence as the result of such thickness and density that the level of hydraulic fluid contained therein may not be normally determined visually by observation through a side wall;
    at least one side wall having a window integrally molded therein during the molding of said reservoir housing;
    said window being sufficiently thin and so molded that the concentration of fibers in the window is substantially less than the concentration of fibers in the other parts of the housing to provide a sufficiently high level of translucence to permit the level of hydraulic fluid contained in said reservoir housing to be visually determined by observation through said window.

4. A method of providing a liquid level observation window as an integral part of a one-piece, fiber-filled plastic, liquid reservoir housing, said method comprising the steps of:
 (a) molding in a mold cavity a liquid reservoir housing with side and bottom walls of plastic and fiber filling in a predetermined proportion such that the amount of fiber filling and the thickness of the walls render the housing sufficiently resistant to light transmittal therethrough to effectively prevent visual determination of the level of liquid in the housing by observation through the walls;
 (b) and while performing step (a), molding as an integral part of a wall a window substantially thinner than the walls and while so molding restricting the flow of the fiber filling into the mold cavity section forming the window so that the window has substantially less percentage of fiber filling therein than do the walls, the thinner window and decrease in percentage of fiber filling in the window rendering the window capable of transmitting sufficient light therethrough to permit visual determination of the level of liquid in the housing by observation through the window.

5. A method of providing a liquid level observation window as an integral part of a one-piece, fiber-filled plastic, liquid reservoir housing, said method comprising the steps of:
 (a) providing a mold for a reservoir housing having side walls and a bottom wall;
 (b) providing a mixture of plastic, such as nylon, and a fiber filling, such as glass fiber;
 (c) molding the reservoir housing in the mold from the mixture with a wall thickness controlled by the mold which is sufficient to permit introduction into the mold and flow of the mixture to form the walls with the fiber filling remaining at substantially the same proportion in the formed walls as it is found in the mixture as introduced into the mold;
 (d) and concurrently molding in a side wall a window section of substantially less thickness than the walls, the thickness of the window section being controlled by the mold and being such that the flow of the fiber filling portion of the mixture into the mold portion defining the window section is substantially inhibited with the result that the window section is formed predominantly from plastic, with the fiber filling proportion in the window section being substantially less than the fiber filling proportion found in the mixture as introduced into the mold, the window section translucence being substantially greater than the translucence of the walls and being sufficient to permit the observation of the liquid level of liquid in the reservoir housing.

* * * * *